May 6, 1958 S. H. ROYER 2,833,912
ARC WELDING APPARATUS
Filed June 6, 1955 2 Sheets-Sheet 1
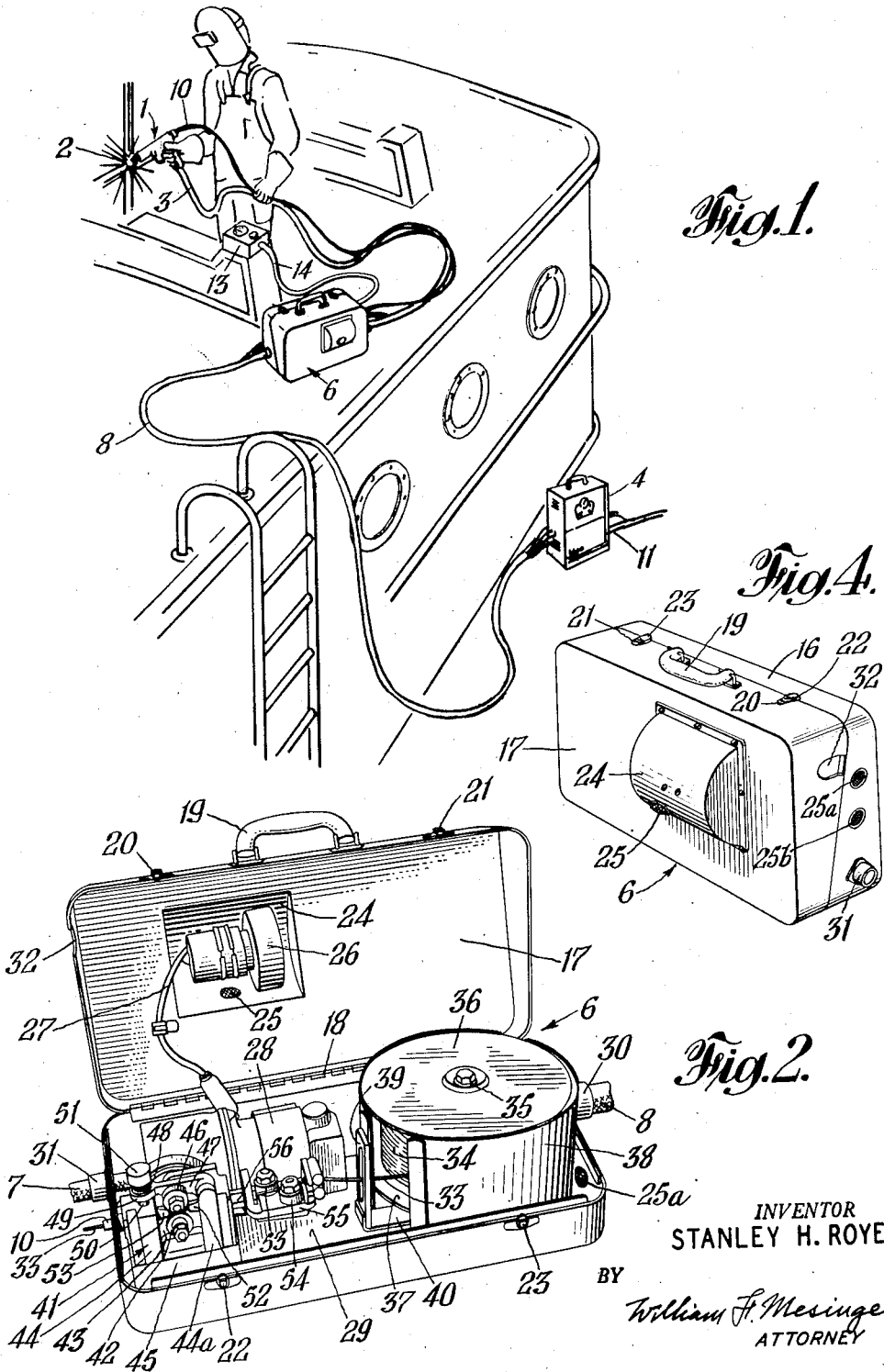
INVENTOR
STANLEY H. ROYER
BY
William H. Mesinger
ATTORNEY INVENTOR
STANLEY H. ROYER
BY
William J. Mesinger
ATTORNEY United States Patent Office 2,833,912
Patented May 6, 1958

2,833,912
ARC WELDING APPARATUS

Stanley H. Royer, Elizabeth, N. J., assignor to Union Carbide Corporation, a corporation of New York Application June 6, 1955, Serial No. 513,216

2 Claims. (Cl. 219—130)

This invention relates to welding and more particularly means for increasing the maneuverability of the equipment employed in gas-shielded arc welding by novel construction and arrangements of the parts of the welding equipment.

In shielded inert gas metal arc welding, a process in which a consumable bare electrode is fed into a weld zone continuously blanketed by an atmosphere of inert gas at a controlled rate, the apparatus ordinarily used comprises two main pieces of equipment: a wire-drive and control assembly and a hand-guided welding torch or gun wherein the welding wire reel and mount therefor is integrated with the control unit in a central cabinet. This conventional structure is heavy and bulky and presents a problem of maneuverability, and accessibility of the welding equipment to the work, particularly in confined spaces. For example, in construction of a ship tanker, confined sections such as the inner bottom are accessible only through manholes. These small manholes are designed to accommodate only the workmen and small readily portable equipment. Welding equipment of conventional construction is too bulky for effective application in this situation.

In general the invention provides that only those elements of the welding apparatus which are required at the immediate site of operation, need be taken into the relatively inaccessible weldment areas.

Broadly, this object is attained, according to the present invention, by separating the welding wire coil and wire drive unit from the electrical control unit, so that the welder apparatus comprises a main control cabinet, a hand-guided torch and a carrycase unit in which are uniquely arranged, the wire drive unit, wire coil and coil mounting means.

Fig. 1 in the drawings is a perspective view showing the welding apparatus of the present invention in operation.

Fig. 2 is a perspective view showing the interior of the carrycase unit of the invention.

Fig. 4 is a perspective view of the carrycase unit.

Figure 3:
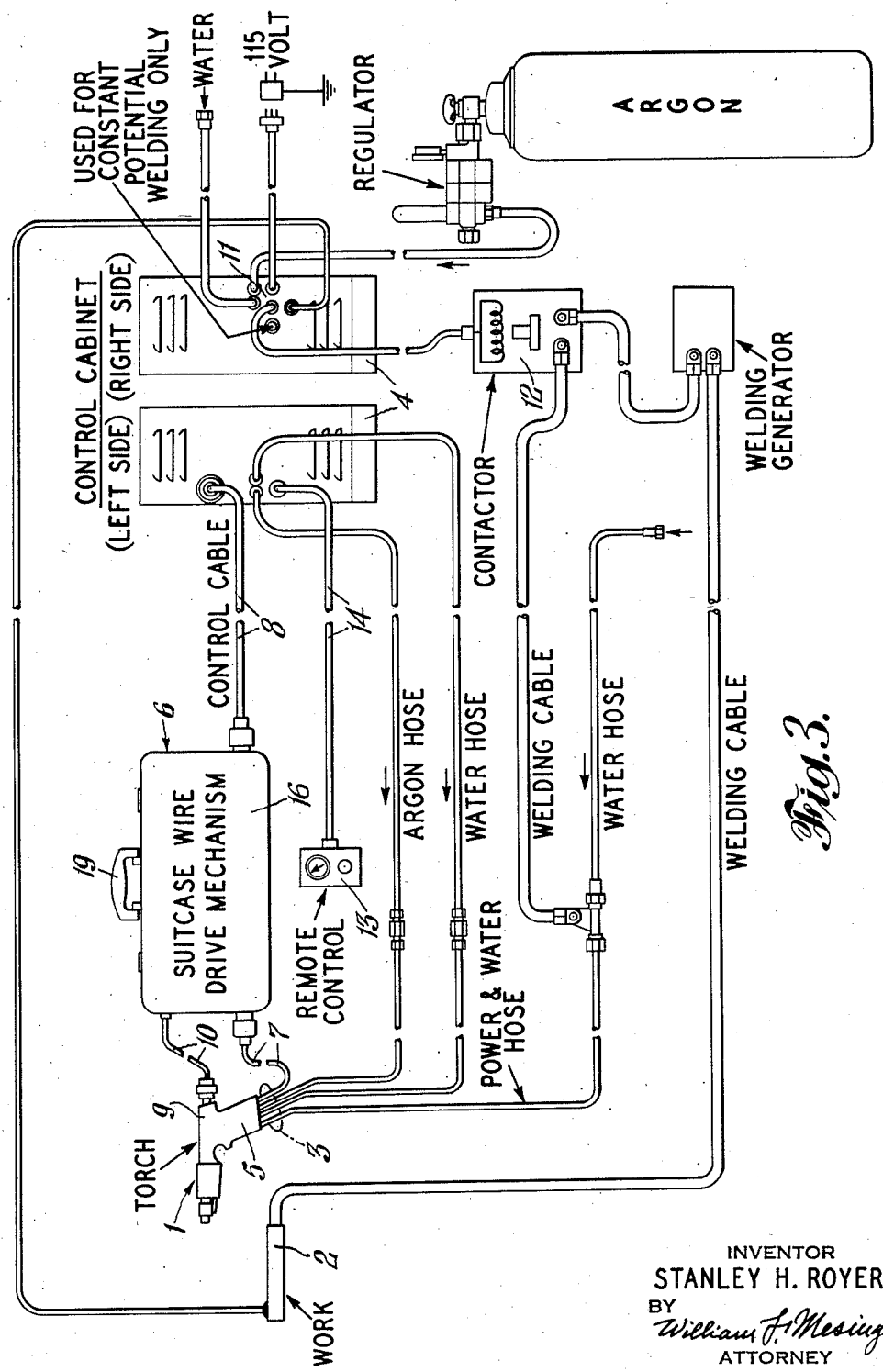
Fig. 3 is a schematic side elevation of the complete apparatus set-up suitable for the practice of the invention.

Referring now more particularly to the drawings, the invention comprises a hand-guided torch or welding gun 1, operating on the work or plate 2 to be welded, with gas, cooling liquid and power means (as seen in Fig. 3) transmitted through flexible insulated cable or hose 3 from main portable electrical control cabinet 4, to the handle 5 of said gun 1 and are attached thereto in suitable manner. A carrycase or suitcase wire drive mechanism 6 containing welding wire feed and straightening means as hereinafter described is connected by a switch-cord control assembly 7 to the handle 5 as part of the common insulated hose assembly 3. This switch cord assembly 7 connects the trigger switch (not shown) on the gun 1 to the main control cabinet through the carrycase 6 and control cable 8. Connected to the back end of the barrel 9 of the gun 1 is a flexible conduit 10 through which passes the wire electrode fed from the carrycase 6.

The electrical connection, water coolant, inert gas and contactor conduits enter the control cabinet or assembly 4 in conventional fashion at 11. A contactor 12 is preferably included for opening and closing the welding circuit. Suitable electrical connection is supplied to the work or plate 2 from this contactor, and the welding gun 1.

A remote control box assembly 13 for adjustment of welding speed maintains contact with the control cabinet 4 by means of conduit 14.

The wire drive mechanism or carrycase 6 comprises a protective portable casing 16 with lid portion 17 hingedly mounted thereon at 18. Situated on said lid member 17 on that edge thereof opposite to the hinge mounting 18 is a handle 19 mounted preferably between lid closure members 20 and 21, which are positioned in operative relation with closure members 22 and 23, respectively, on the casing edge.

Also present in said lid member, is offset housing 24 with air vent 25 (seen in Fig. 4). The portable casing 16 also contains vent means 25a and 25b. This offset housing 24 contains electric fan unit 26 supplied with current through insulated electrical cord 27 coincident with energization of electric motor 28 mounted on base 29 of the portable casing 16. There are differment ways this can be done, preferably fan unit 26 is energized when switch on cabinet 4 is turned to "on" position.

Passages 30 and 31 are provided in casing 16 for the control cable 8, and switch cord assembly 7, respectively. An aperture 32 (as seen in Fig. 4) for the passage of the filler wire welding electrode is formed preferably in the border of the lid member 17.

The welding electrode 33 (as seen in Fig. 2) is dispensed from a reel 34 mounted on a rotatable hub 35 within a frame 36, and supported on base 29 said reel 34 being partially enclosed by the reel casing 38. The wire electrode passes through entrainer or wire guide 39 which is supported on the arm 40 mounted on frame 37 and is passed into the wire feed unit of the type disclosed in Anderson Patent No. 2,681,401. This latter unit 41 is driven by the electric motor 28 mounted on the base 29, and comprises a feed roll 42 fixed to a plate 43 extending between blocks 44 and 44a, which is with the rest of the feed unit supported by feed unit mount 45 on base 29. A second cooperating feed roll 46 is situated directly above said first feed roll and is fixed to a rocker arm 47, which is pivotally connected to the block 44a. A coil spring 48 bears down on the circular portion 49 of the rocker arm 47 at that point at which it overhangs the block 44. This spring is tensioned by an adjusting screw 50 bearing on its upper end, which may be turned by means of a knob 51. It is apparent that feed roll 46 is a floating roll, yieldingly urged by the spring 48 toward the fixed feed roll 42.

At the side of the plate 43 opposite the feed rolls 42 and 46 are a set of interconnecting gears connected to said feed rolls 42 and 46 in such a manner that when the electric motor 28 operates to drive fixed feed roll 42, cooperating feed roll 46 is also positively driven. The filler wire 33 passes between these two feed rolls and is drawn by them from the reel 34 through the first wire guide 39 and through a second wire guide 52 and pushed by them through wire guide 53 into flexible conduit 10 to the welding gun 1.

Prior to entering the wire guide 52 and after leaving wire guide 39 the wire welding electrode passes between a pair of guide rollers 53 and 54 rotatably mounted on a U-frame 55 journalled to block 44a by nut 56 and thence into wire feed guide 52.

With the apparatus as described hereinbefore and due to the separation of the welding wire coil and drive unit from the welding control cabinet, it is seen that the operator may leave the bulky control unit in a location remote from the weldment area and proceed with the compact readily portable carrycase unit and welding gun through confined and otherwise inaccessible passages to the site of operation where the carrycase may then be located close to the welding zone.

What is claimed is:

1. In an arc welding apparatus including a welding control assembly and a wire drive unit for feeding filler wire to the welding zone, a carry case unit adapted to be moved close to the welding zone comprising a portable casing having a lid hinged thereto at the bottom, a wire drive motor mounted on the bottom of said casing at one side of the hinge having a horizontal motor shaft and a vertical shaft driving wire feed rollers thereabove receiving wire from a reel mounted on a horizontal rotatable hub secured to the side of said casing above and transverse to said motor shaft, said casing in loading position lying on its side with its lid open having said reel shaft upstanding for convenient loading of the reel thereon.

2. In an arc welding apparatus including a welding control assembly, a hand gun, a flexible conduit, and a wire drive unit for feeding welding wire through said flexible conduit to the welding gun, a carry case unit to be moved close to the welding zone comprising a portable casing for said wire drive unit having a base with an upstanding surrounding wall and a movable lid covering the top of said wall, a wire drive motor mounted on said base at one side thereof and having a motor shaft for driving wire feed rollers, a wire reel mounted on a rotatable hub secured to said base transverse to said motor shaft, and an outlet for said flexible conduit in said upstanding wall parallel to said motor shaft, said casing in its loading position lying on said base with its lid open having said reel shaft upstanding for convenient loading of said reel thereon.

References Cited in the file of this patent

UNITED STATES PATENTS

| | | |
|---|---|---|
| 2,510,205 | Baird | June 6, 1950 |
| 2,606,267 | McElrath | Aug. 5, 1952 |
| 2,753,425 | Flood et al. | July 3, 1956 |
| 2,767,302 | Brashear | Oct. 16, 1956 |